(12) United States Patent
Satterfield et al.

(10) Patent No.: US 7,530,029 B2
(45) Date of Patent: May 5, 2009

(54) NARROW MODE NAVIGATION PANE

(75) Inventors: Jesse Clay Satterfield, Seattle, WA (US); Jensen M. Harris, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 212 days.

(21) Appl. No.: 11/136,800

(22) Filed: May 24, 2005

(65) Prior Publication Data

US 2006/0271864 A1 Nov. 30, 2006

(51) Int. Cl.
*G06F 3/048* (2006.01)
*G06F 3/00* (2006.01)

(52) U.S. Cl. .................. 715/779; 715/810; 715/815

(58) Field of Classification Search .......... 715/779, 715/810, 815, 828, 841, 843, 907, 743
See application file for complete search history.

(56) References Cited

U.S. PATENT DOCUMENTS

| | | | | |
|---|---|---|---|---|
| 5,588,107 | A | * 12/1996 | Bowden et al. | 715/828 |
| 5,625,783 | A | 4/1997 | Ezekiel et al. | 395/352 |
| 5,644,737 | A | * 7/1997 | Tuniman et al. | 715/810 |
| 5,659,693 | A | * 8/1997 | Hansen et al. | 715/779 |
| 5,734,915 | A | 3/1998 | Roewer | 395/773 |
| 5,760,768 | A | 6/1998 | Gram | 345/333 |
| 5,812,132 | A | * 9/1998 | Goldstein | 715/797 |
| 6,216,122 | B1 | 4/2001 | Elson | |
| 6,219,670 | B1 | 4/2001 | Mocek | |
| 6,278,450 | B1 | 8/2001 | Arcuri et al. | 345/334 |
| 6,405,216 | B1 | 6/2002 | Minnaert et al. | 707/104.1 |
| 6,429,882 | B1 | 8/2002 | Abdelnur et al. | 345/763 |
| 6,433,801 | B1 | 8/2002 | Moon et al. | 345/840 |
| 6,459,441 | B1 | 10/2002 | Perroux et al. | 345/837 |
| 6,686,938 | B1 | 2/2004 | Jobs et al. | 345/835 |
| 6,924,797 | B1 | 8/2005 | MacPhail | 345/326 |
| 7,032,210 | B2 | 4/2006 | Alloing et al. | 717/106 |

(Continued)

FOREIGN PATENT DOCUMENTS

EP    1223503    7/2002

(Continued)

OTHER PUBLICATIONS

Microsoft Press, Microsoft Computer Dictionary, Microsoft Press, Fifth Edition, pp. 374,382.*

(Continued)

*Primary Examiner*—Dennis Bonshock
(74) *Attorney, Agent, or Firm*—Merchant & Gould P.C.

(57) ABSTRACT

A narrow mode navigation pane is provided that may be selectively displayed as a replacement of a normal mode or full-size navigation pane to allow more display space for other user interface content. The narrow mode navigation pane is divided into sections, each section including selectable controls for providing data or functionality previously displayed in and selectable from the normal mode navigation pane. Selection of a "Navigation Pane" control causes the temporary display of a pop-up version of the normal mode navigation pane for allowing a user to view and/or select the full contents of the normal size navigation pane without toggling to the normal mode navigation pane. Additional sections of the narrow mode navigation pane may include selectable controls representing a subset of controls from the normal mode pane and for launching other software applications and associated user interfaces.

12 Claims, 8 Drawing Sheets

U.S. PATENT DOCUMENTS

| | | | |
|---|---|---|---|
| 7,337,185 B2 | 2/2008 | Ellis et al. | |
| 7,360,174 B2 | 4/2008 | Grossman et al. | |
| 2002/0140731 A1 | 10/2002 | Subramaniam et al. | 345/762 |
| 2002/0196293 A1 | 12/2002 | Suppan et al. | 345/853 |
| 2003/0070143 A1 | 4/2003 | Maslov | 715/513 |
| 2003/0163455 A1 | 8/2003 | Dettinger et al. | 707/3 |
| 2003/0169284 A1 | 9/2003 | Dettinger et al. | 715/708 |
| 2003/0227487 A1 | 12/2003 | Hugh | |
| 2004/0003351 A1 | 1/2004 | Sommerer et al. | |
| 2004/0109033 A1 | 6/2004 | Vienneau et al. | 345/863 |
| 2004/0119760 A1 | 6/2004 | Grossman et al. | 715/854 |
| 2004/0243938 A1 | 12/2004 | Weise et al. | |
| 2004/0268231 A1 | 12/2004 | Tunning | 715/513 |
| 2005/0010871 A1 | 1/2005 | Ruthfield et al. | 715/712 |
| 2005/0183008 A1 | 8/2005 | Crider et al. | 715/517 |
| 2005/0256867 A1 | 11/2005 | Walther et al. | |
| 2006/0020962 A1 | 1/2006 | Stark | |
| 2006/0041545 A1 | 2/2006 | Heidloff et al. | |
| 2006/0080303 A1 | 4/2006 | Sargent et al. | |
| 2006/0173824 A1 | 8/2006 | Bensky | |
| 2007/0185826 A1 | 8/2007 | Brice et al. | |

FOREIGN PATENT DOCUMENTS

| | | |
|---|---|---|
| EP | 1376337 | 2/2004 |
| GB | 2391148 | 1/2004 |
| WO | WO 02/091162 A2 | 11/2002 |
| WO | WO 02/091162 A3 | 11/2002 |

OTHER PUBLICATIONS

PCT International Search Report in PCT/US2006/035467 dated Feb. 6, 2007.
David Pogue, Windows XP Home Edition: The Missing Manual, O'Reilly, 1st Edition, May 1, 2002, pp. 37, 38, and 41.
U.S. Office Action dated May 30, 2008, for U.S. Appl. No. 11/430,562.
U.S. Office Action dated Jun. 27, 2008, for U.S. Appl. No. 11/430,416.
Charles Rich, Candace L. Sidner, "Segmented Interaction History in a Collaborative Interface Agent," 1997 ACM, pp. 23-30.
Andrew Dwelly, "Functions and Dynamic User Interfaces," 1989 ACM, pp. 371-381.
Alias I. Wavefront, "The Hotbox: Efficient Access to a Large Number of Menu-items," ACM 1999, pp. 231-237.
Charles Rich, Candace L. Sidner, "Adding a Collaborative Agent to Graphical User Interfaces," 1996 ACM, pp. 21-30.
Boyce, "Microsoft Outlook Inside Out," 2001, pp. 67, 68, 109, 110, 230, 231, 310, 316-318, 798.
Halvorson and Young, "Microsoft Office XP Inside Out," 2001, pp. 1005-1009, 1015, 1023-1028, 1036-1039, 1093.
Riggsby, McCoy, Haberman and Falciani, "Mastering Lotus Notes and Domino 6," 2003, pp. 135-139.
U.S. Appl. No. 10/851,442, filed May 21, 2004, entitled "Conversation Grouping of Electronic Mail Records".
Riggsby, McCoy, Haberman and Falciani, "Mastering Lotus Notes and Domino 6," 2003, pp. 135-138, 607-612.
Examination Report, Jul. 25, 2005.
Search Report, Danish Patent and Trademark Office, Sep. 18, 2006.
Written Opinion, Danish Patent and Trademark Office, Sep. 18, 2006.
Search Report, Danish Patent and Trademark Offiice, Sep. 19, 2006.
Boyce, "Microsoft Outlook Inside Out," 2001, pp. 133, 134, 721-728.
Halvorson and Young, "Microsoft Office XP Inside Out," 2001, pp. 4, 5, 10, 11, 70-74, 281-288, 1010-1014, 1173-1175.
Riggsby, McCoy, Haberman and Falciani, "Mastering Lotus Notes and Domino 6," 2003, pp. 18, 22, 33-35, 47, 122, 123, 215-241, 378.
"Find any file or email on your PC as fast as you type!" http://www.x1.com, 2003 (1 page).
"About Google Desktop Search," http://www.desktop.google.com/about.html, Oct. 15, 2004 (8 pages).
"Lookout," http://www.lookoutsoft.com, Apr. 22, 2005 (20 pages).
"Yahoo to test desktop search," http://news.com.com/yahoo+to+test+desktop+searach/2100-1032_3-5486381.html, Dec. 9, 4004 (6 pages).
"Microsoft reinvents its own wheel," http://www.theinquirer.net/default.aspx?article=20214, Dec. 14, 2004 (5 pages).
"MSN Desktop Search (beta)," http://www.pcmag.com/article2/0,1895,1771841,00.asp, Mar. 2, 2005 (.
"Windows Desktop Search," http://kunal.kundaje.net/reviews/wds.html, Jul. 10, 2005 (7 pages).
"Microsoft Enters Desktop Search Fray," http://www.internetnews.com/ent-news/article.php/3447331, Dec. 13, 2004 (5 pages).
"Primary Windows," http://www-03.ibm.com/servers/eserver/iseries/navigator/guidelines/primary.html, date unknown, (23 pages).
"User Interface Standards," http://msdn2.microsoft.com/en-us/library/aa217660(office.11,d=printer).aspx, Sep. 2001 (5 pages).
"WebSphere Studio Overview," http://researchweb.watson.ibm.com/journal/sj/432/budinsky.html, May 6, 2004 (25 pages).

* cited by examiner

NARROW MODE NAVIGATION PANE

FIELD OF THE INVENTION

The present invention relates to computer-generated user interfaces. More particularly, the present invention relates to a narrow mode navigation pane for use in association with a computer-generated user interface.

BACKGROUND OF THE INVENTION

With the advent of the computer age, computer software users have grown accustomed to user-friendly software applications that help them write, calculate, organize, prepare presentations, send and receive electronic mail, make music, and the like. For example, modern electronic mail applications allow users to send and receive electronic mail to and from other users. Modern electronic mail applications also allow users to store sent or received mail in a variety of user-established storage folders. Modern electronic calendar applications allow users to maintain a variety of calendar information, such as appointments, in an electronic medium. Modern contacts applications allow users to maintain, sort, and access contact information, such as addresses, telephone numbers, electronic mail addresses, and the like, for a variety of persons or entities.

For such software applications, a computer-generated user interface is typically provided to allow users to access and utilize the functionality of a given application along with data input, sent, or received by the user. For example, a typical electronic mail application user interface provides a view pane in which the contents of a given electronic mail message may be displayed. A second pane in the form of a mailbox pane (e.g., inbox, outbox or sent items mailbox) is typically provided to allow a user to see a listing of all received or sent mail items.

Often, such software applications also provide a navigation pane for allowing the user to navigate through various functionality items associated with the software application and/or data items associated with a given user. For example, a navigation pane for an electronic mail application may provide a list of all electronic mail types, such as received mail, sent mail, unread mail, and the like. Selection of one of these mail types causes the associated mail to be provided in other portions of the user interface. For example, selection of an inbox mail item from the navigation pane causes the inbox pane to be launched and to be populated with all received electronic mail and causes the electronic mail view pane to be populated with the contents of one of the listed received mail items (e.g., the first electronic mail item in the list). Similarly, selection of a sent mail data type from the navigation pane causes a sent mailbox pane to be launched and to be populated with all sent electronic mail items and causes the electronic mail view pane to be populated with the contents of one of the listed sent email items (e.g., the first sent mail item in the list). The electronic mail navigation pane may also include a list of email folders in which a user manually or automatically stores various email items.

A navigation pane for an electronic calendar application may provide one or more date picker controls for allowing the user to navigate to different months, weeks, and dates in an electronic calendar for receiving or editing calendar items, such as appointments. An electronic calendar application navigation pane may also include one or more folders associated with different calendars (e.g., business calendar or personal calendar). A navigation pane for a contacts application may provide a list of contacts folders, such as business contacts, personal contacts, and the like.

Many users of such applications like to display all of the above-described panes simultaneously. For example, many electronic mail users display the mail view pane, the mailbox pane and the navigation pane simultaneously. Users of electronic calendar applications often like to display a navigation pane simultaneously with a displayed calendar. Users of a contacts application may desire to simultaneously display a contacts application navigation pane with a user interface containing selected contacts information. Unfortunately, displaying the navigation pane along with other content panes often consumes too much space on the user's computer display screen which causes the information displayed in the other panes to be truncated or displayed over a number of lines which results in a less than satisfying visual presentation and/or user experience. This problem is particularly troublesome for small computer displays.

Accordingly, there is a need for an improved navigation pane that may be selectively toggled between a normal mode and narrow mode for optimally utilizing computer display space. It is with respect to these and other considerations that the present invention has been made.

SUMMARY OF THE INVENTION

Embodiments of the present invention solve the above and other problems by providing an improved navigation pane user interface that may be toggled between a normal mode and a narrow mode for allowing users to better utilize available computer display space. According to embodiments of the present invention, a display mode toggle control is provided for toggling a navigation pane from a normal mode to a narrow mode. The display mode of the navigation pane may also be selected from a view menu launched from an application tool bar or other collection of functionality controls. When a normal size navigation pane is toggled to a narrow mode, the user interface containing the normal size navigation pane is replaced with a narrow bar extending vertically down the length of the user interface of the associated software application. According to one embodiment, the narrow bar is displayed along a left-hand side of the presently displayed user interface, for example, electronic mail, calendar application, or contacts application user interfaces.

The narrow bar is divided into sections, and each section may include one or more selectable controls for providing data or functionality previously displayed in and selectable from the normal mode navigation pane. According to one embodiment, a first section of the narrow bar includes a toggle control for toggling the narrow mode navigation pane back to a normal mode navigation pane. A second section of the narrow bar includes a "Navigation Pane" control. Different sections of the narrow bar may be identified by including a recognizable icon or by including a text identifier displayed in a sideways bottom-to-top orientation. For example, the "Navigation Pane" control may include a text identification of "Navigation Pane" displayed in a sideways bottom-to-top orientation in the associated section of the narrow bar.

Selection of the "Navigation Pane" control causes the temporary display of a pop-up version of the normal size navigation pane for allowing a user to view the full contents of the normal size navigation pane without toggling the narrow mode navigation pane to the normal mode navigation pane. Selection of a subsequent control or selection in a portion of the computer display space outside of the pop-up normal mode navigation pane dismisses the pop-up navigation pane. Selection of the "Navigation Pane" section of the narrow bar for an electronic calendar application causes a temporary pop-up navigation pane for the calendar application, and the pop-up pane may display date picker controls and other calendar application functionality normally displayed in the normal mode navigation pane.

Other sections of the narrow bar navigation pane may include selectable controls representing a useful subset of controls normally populated in the normal mode pane. For example, for an electronic mail application, one section of the narrow bar may include an "Inbox" control with which the user may selectably cause received mail items to be displayed in an inbox pane, and with which the user may cause the display of received mail items in a mail view pane. Similarly, another section of the narrow bar may include a "Sent Mail" control with which the user may selectably cause the display of sent mail items in a sent mailbox pane, and with which the user may cause the display of the contents of sent mail items in the electronic mail view pane.

Additional sections of the narrow bar may provide selectable controls for launching the user interfaces of other software applications. For example, a selectable control may be provided in the narrow bar for launching an electronic mail application and associated user interface. A second selectable control may be provided for launching a calendar application and associated user interface. A third selectable control may be provided for launching a contacts application and associated user interface. Other selectable controls for launching other software applications may be provided in the narrow bar navigation pane. According to one embodiment of the present invention, the content and controls of the narrow mode navigation pane may be altered by the user to provide more or less selectable controls for displaying data listed in the normal mode navigation pane or for providing functionality accessible through the normal mode navigation pane.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to a narrow mode navigation pane that may be selectively displayed as a replacement of a normal or full-size navigation pane to allow more computer display space for displaying other user interface content. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
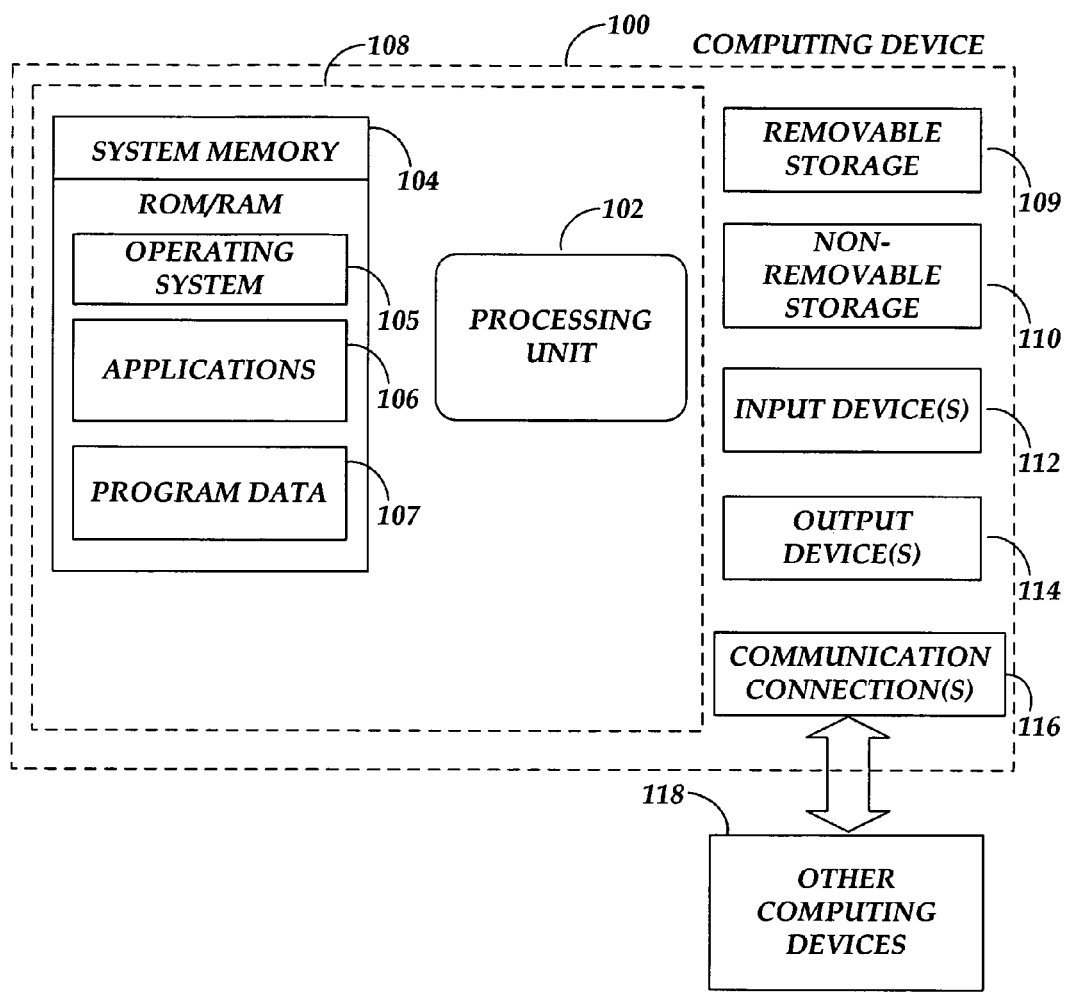
FIG. 1 illustrates an exemplary computing operating environment for embodiment of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS operating systems from MICROSOFT Corporation of Redmond, Wash. The system memory 104 may also include one or more software applications 106, and may include program data 107. This basic configuration is illustrated in FIG. 1 by those components within dashed line 108.

In one embodiment, the application 106 may comprise many types of programs, such as a word processing application program, a spreadsheet application, a desktop publishing, and the like. According to an embodiment of the present invention, the application program 106 comprises a multiple-functionality software application for providing a user calendaring functionality, electronic mail functionality, contacts information functionality, electronic notes functionality, electronic journal functionality and the like. Some of the individual program modules comprising such a multiple-functionality program 106 include a calendar module, an electronic mail program, a contacts module, a tasks module, a notes module and a journal module (not shown). An example of such a multiple-functionality program 106 is OUTLOOK® manufactured by Microsoft Corporation.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes storage media.

Figure 2:
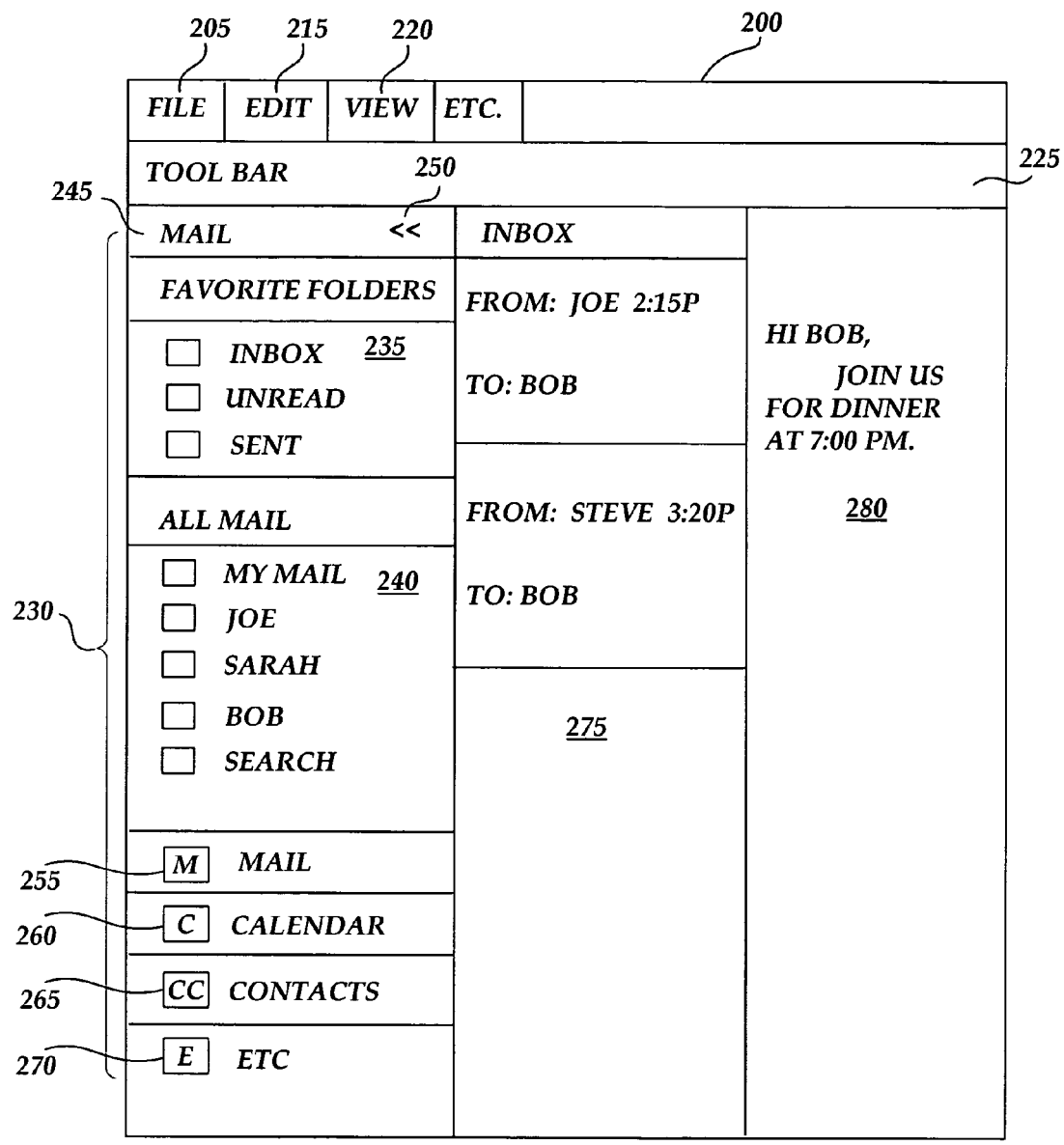
FIG. 2 illustrates a computer screen display of an electronic mail application user interface showing a normal mode navigation pane.

FIG. 2 illustrates a computer screen display of an electronic mail application user interface showing a normal mode navigation pane. The user interface 200 is representative of an electronic mail application user interface in which a variety of electronic mail items may be displayed to a user. As should be understood by those skilled in the art, the user interface 200 illustrated in FIG. 2 along with the example content illustrated in the user interface 200 is for purposes of example only and is not limiting or restrictive of the vast amount of different types of electronic mail content and functionality that may be provided in an electronic mail application user interface. Referring then to FIG. 2, the user interface 200 illustrated in FIG. 2 includes a variety of functionality buttons including a file button 205, an edit button 215, a view button 220, and a tool bar 225 in which may be displayed a variety of selectable functionality controls (not shown) for selecting functionality for operating on data displayed in the user interface 200.

Along the right-hand side of the user interface 200 is an electronic mail view pane 280. In the view pane 280, the contents of a selected or given electronic mail message may be displayed to allow a user to quickly review a portion or all of the contents of a given electronic mail message. A mailbox pane 275 is displayed in the middle of the user interface 200. The mailbox pane 275 may be in the form of an inbox, sent mailbox, unread mailbox, particular mail folder mailbox, and the like. The mailbox 275 includes a listing of received or sent electronic mail items associated with a given mail data type (e.g., received, sent, unread, folder, etc.). As should be understood by those skilled in the art, the mailbox pane 275 may be selectively replaced with an inbox pane, outbox pane, a sent mail items pane, an unread mail pane, or a variety of other panes associated with different types of mail items that may be reviewed via the user interface 200. According to embodiments of the present invention, the content provided in the email view pane 280 is keyed to electronic mail items listed in the mailbox pane 275.

Along the left-hand side of the user interface 200 is a normal mode navigation pane 230. According to embodiments of the present invention, the width of the normal mode navigation pane 230 may be selectively increased or decreased by the user by grabbing the right-hand edge of the navigation pane 230 and dragging the edge outward or inward as desired. According to one embodiment, a minimum width for the normal mode navigation pane 230 may be imposed on the user by design. For example, a minimum width of the normal mode navigation pane 230 may be set to a width, such as 35 pixels, to prevent the width of the normal mode navigation pane 230 from being decreased to a point that the content of the navigation pane 230 is unusable. As illustrated in FIG. 2, display of the normal mode (full-size) navigation pane 230 consumes a relatively large amount of the computer display space available for displaying content. As described in the background section above, consuming this amount of space for the normal mode navigation pane 230 decreases the amount of display space available for other content in the mailbox pane 275 or in the electronic mail view pane 280.

The normal mode navigation pane 230 may include selectable items associated with various types of data that may be displayed and/or edited via the user interface 200. For example, a favorite folders section 235 includes an inbox data type, an unread mail data type, and a sent mail data type. Selection of one of these data types causes a display of the associated panes 275 and 280, as described above. For example, selection of the inbox data type from the favorite folders section 235 causes an inbox pane 275 and an associated electronic mail view pane 280 to be displayed, as illustrated in FIG. 2. Selection of a different data type, for example, the sent mail data type, causes display of a sent mail pane 275 and causes display of an associated electronic mail view pane 280. An additional section 240 contained in the navigation pane 230 includes various folders that may be set up by a user into which the user may manually or automatically store electronic mail messages. Selection of a given folder from the section 240 causes the display of an associated mailbox pane 275 and associated electronic mail view pane 280. For example, selection of the "Joe" mail folder in the section 240 may cause a mailbox view pane 275 for displaying all electronic mail items received from Joe. Likewise, the view pane 280 will display the content of a given or selected mail item received from "Joe." As should be understood by those skilled in the art, the example electronic mail types listed in the navigation pane 230, illustrated in FIG. 2, are for purposes of example only and are not restrictive or limiting of the vast numbers of mail types or folder categories that may be included in the navigation pane 230.

At the lower end of the navigation pane 230 is a software application module selection area. The software module selection area includes selectable controls associated with different software applications that may be selected for launching associated applications and associated user interfaces 200. For example, selection of the mail control 255 causes the launching of an associated electronic mail application and the display of an electronic mail application user interface 200, as illustrated in FIG. 2. Similarly, selection of the calendar control 260 causes the launching of an electronic calendar application and causes the display of an associated calendar application user interface 200, as described below with respect to FIGS. 5 and 8. Selection of a contacts control 265 causes the launching of a contacts application and causes the launching of an associated contacts application user interface 200 (not shown). As should be understood by those skilled in the art, the number and types of software application modules illustrated in FIG. 2 are for purposes of example only and are not limiting of the different types of software application modules that may be selected via a selectable control 255, 260, 265, 270. Also, as should be understood, the icons illustrated in FIG. 2 for the selectable controls 255, 260, 265, 270 are for purposes of example only and are not limiting of the variety of different types of visual icons that may be used for identifying different software applications.

Figure 3:
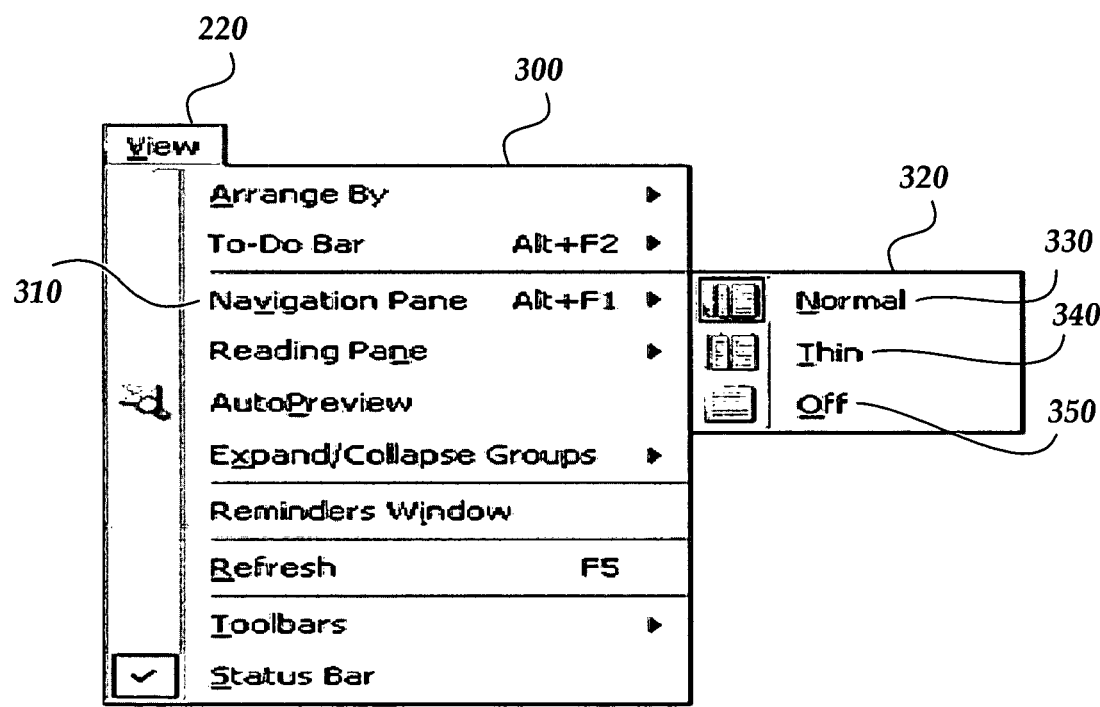
FIG. 3 illustrates a computer screen display of a drop-down menu for selectively toggling between a normal mode navigation pane and narrow mode navigation pane according to embodiments of the present invention.

According to embodiments of the present invention, a navigation pane mode toggle 250 is provided in the upper right-hand corner of the navigation pane 230. As will be described below with reference to FIG. 4, selection of the toggle 250 automatically replaces the normal mode navigation pane 230 with the narrow mode navigation pane 400, described herein. Referring to FIG. 3, according to an alternative embodiment, the display mode of the navigation pane 230 may be changed from a normal mode to a narrow mode via drop-down view menu 300. According to this embodiment, selection of the view control 220 from the user interface 200 causes the display of a drop-down menu 300 with which the user may selectively control various view properties associated with the user interface 200. Selection of the navigation pane control 310 causes a pop-out menu 320 from which the user may select the normal mode 330, the thin or narrow mode 340, or with which the user may selectively turn off the navigation pane 230 altogether.

According to one embodiment, the display mode of the navigation pane is persisted across sessions of the associated software application. For example, if the narrow mode navigation pane is displayed, and the user exits from use of the associated software application (e.g., electronic mail application), when the user subsequently opens the associated software application for a subsequent session, the previously used display mode for the navigation pane will be displayed for the subsequent session. That is, if the navigation pane was previously in the narrow mode, then the navigation pane will be displayed in the narrow mode upon initiation of a subsequent session.

Figure 4:
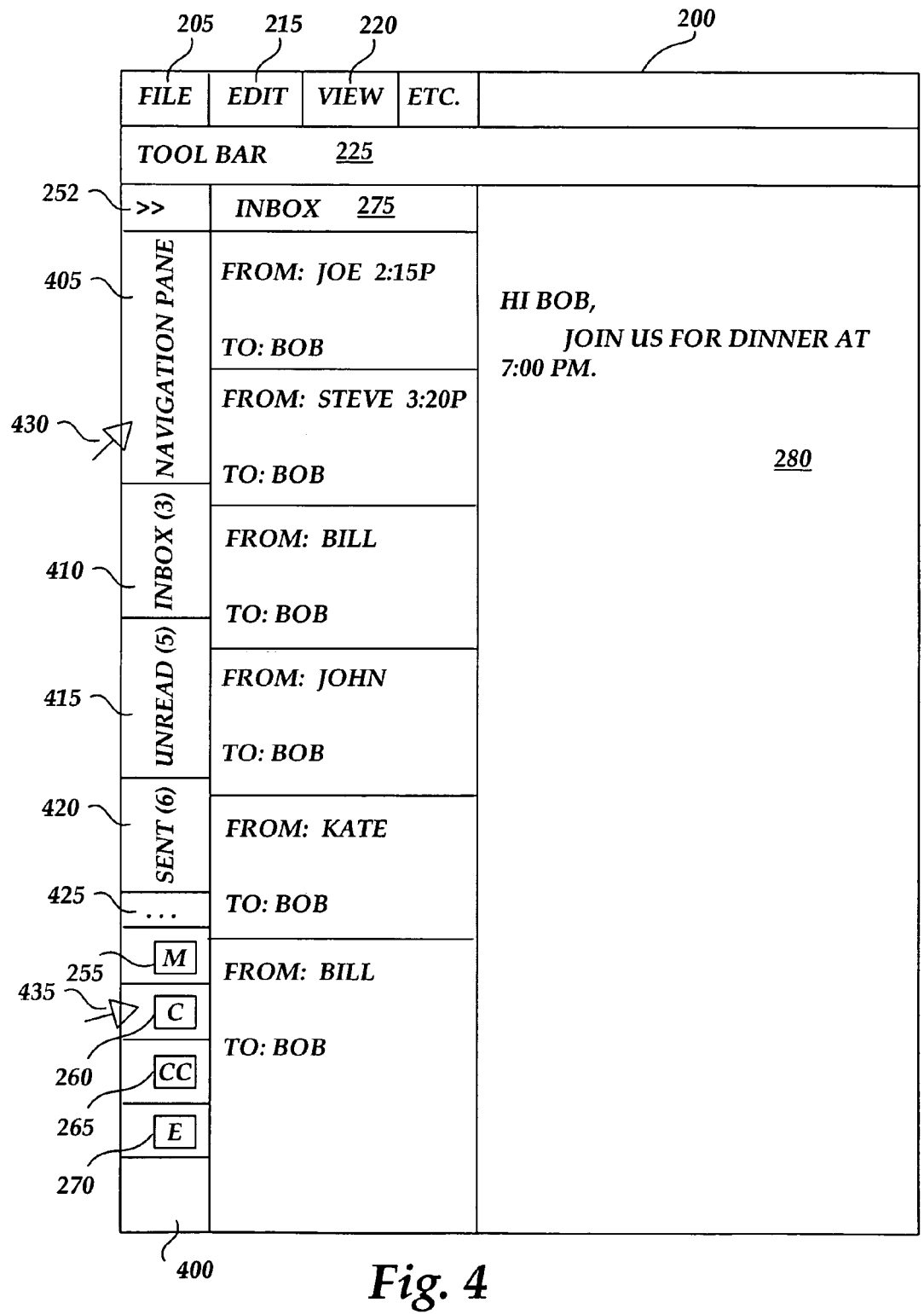
FIG. 4 illustrates a computer screen display of an electronic mail user interface showing a narrow mode navigation pane according to embodiments of the present invention.

FIG. 4 illustrates a computer screen display of an electronic mail user interface showing a narrow mode navigation pane 400 according to embodiments of the present invention. The normal mode navigation pane 230, illustrated in FIG. 2, is replaced by the narrow mode navigation pane 400 in the form of narrow bar extending vertically down the length of the user interface 200 of the associated software application. According to one embodiment of the present invention, the narrow mode navigation pane 400 is displayed along a left-hand side of the presently displayed user interface 200, as illustrated in FIG. 4. However, as should be understood by those skilled in the art, the narrow mode navigation pane 400 may be disposed along the right-hand edge of the user interface 200 or between the mailbox 275 and the electronic mail view pane 280.

Referring still to FIG. 4, at the top of the narrow mode navigation pane 400 a navigation pane toggle 252 is displayed for toggling the narrow mode navigation pane back to a normal mode navigation pane, as illustrated in FIG. 2. As described above with reference to FIG. 3, the narrow mode navigation pane illustrated in FIG. 4 also may be toggled back to the normal mode navigation pane by selection of the normal mode control 330 from the drop-down view menu 300.

As illustrated in FIG. 4, the narrow mode navigation pane 400 is divided into one or more sections in which are disposed selectable functionality controls for displaying content in the user interface 200 according to various data types and functionalities previously displayed in the normal mode navigation pane 230. According to this embodiment, the narrow mode navigation pane 400 includes controls associated with a subset of the controls present in the normal mode navigation pane. A first section 405 includes a "Navigation Pane" control for selectively displaying a pop-out version of the normal mode navigation pane 230, as described below with reference to FIGS. 7 and 8. In addition to the "Navigation Pane" control 405, other sections including the inbox section 410, the unread mail section 415, and the sent mail section 420 provide controls for selectively displaying associated data in the user interface 200. For example, selection of the "Inbox( )" control 410 causes display of inbox data in the mailbox 275 and associated electronic mail content in the view pane 280. Similarly, selection of the "Unread( )" control 415 causes display of unread mail items in the mailbox 275 and associated electronic mail content in the view pane 280.

As should be understood by those skilled in the art, the selectable controls 410, 415, 420 represent a subset of the controls normally available in the normal mode navigation pane 230, illustrated in FIG. 2. The controls populated in the narrow mode navigation pane 400 may be selected for display in the pane 400 based on different criteria such as "most often used," "most recently used," and the like. Alternatively, the selectable controls 410, 415, 420 may be displayed based on user selection. For example, according to one embodiment, a user may replace one of the controls 410, 415, 420 with a different control such as the control for a particular mail folder that is heavily used by a given user.

Each of the controls 405, 410, 415, 420 are identified with a text-based identification, for example, "Navigation Pane," "Inbox( )," and the like. As illustrated in FIG. 4, the text-based identification is displayed in a sideways bottom-to-top orientation for enhancing readability. As should be appreciated, the text-based identification may be displayed according to many other orientations, for example, sideways top-to-bottom orientation, vertical letter-over-letter orientation, etc. Additional information may be provided such as the mail item count associated with each of the mail types. For example, the control 410 includes a parenthetical mail count of 3 mail items. This count identifies to the user that 3 mail items are presently in the user's inbox. According to embodiments of the present invention, the selectable controls 405, 410, 415, 420 may be displayed with one or more background colors for enhancing the visual presentation of the controls displayed in the narrow mode navigation pane 400.

Referring still to FIG. 4, the software application module selection icons 255, 260, 265, 270 are displayed at the lower end of the narrow mode navigation pane 400 beneath the navigation pane controls 405, 410, 415, 420. As described above with reference to FIG. 2, selection of one of the software application module icons 255, 260, 265, 270 causes the launching of the associated software application and associated user interface 200. A control 425 is displayed between the navigation pane content controls and the software application controls 255, 260, 265, 270. As described below with reference to FIG. 6, selection of the control 425 may be used for expanding the display space in the narrow mode navigation pane 400 for displaying selectable content controls for decreasing the space available in the pane 400 for displaying software application selection controls 255, 260, 265, 270

Figure 5:
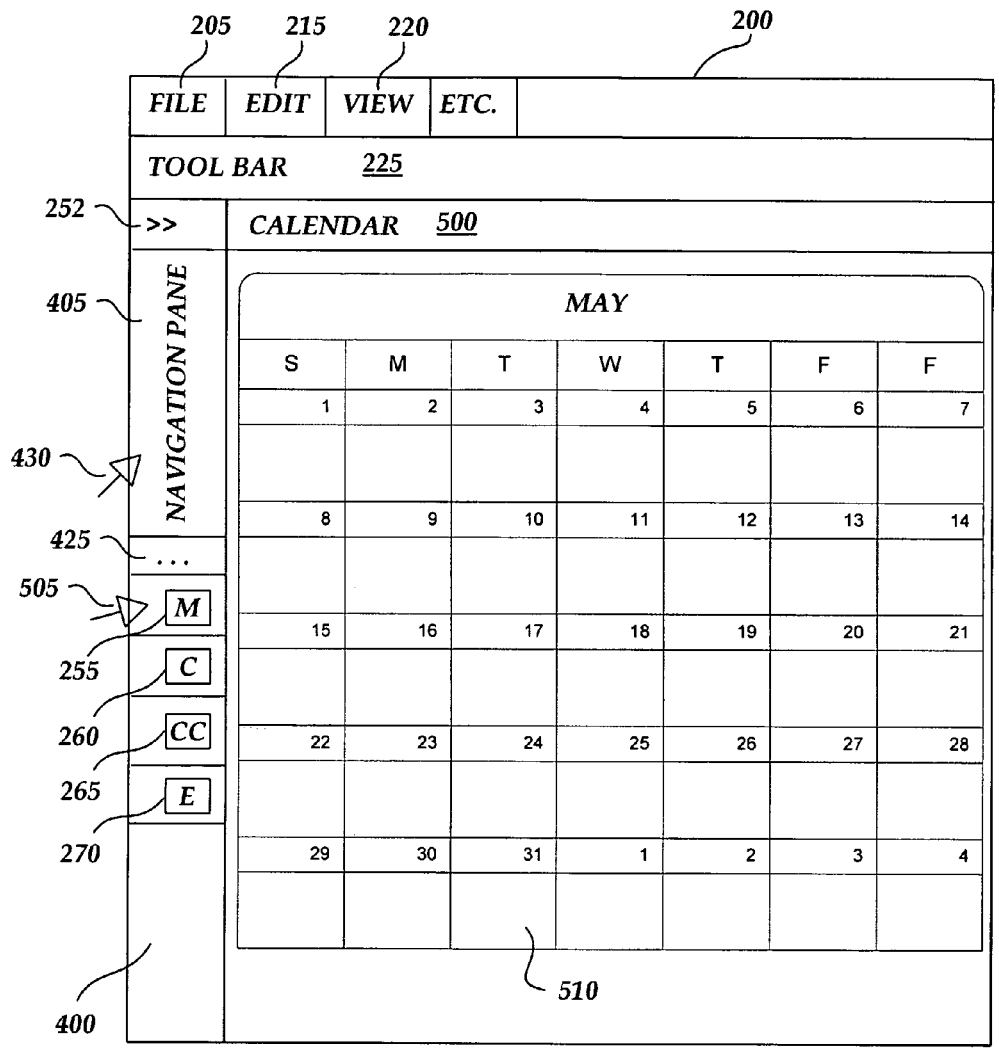
FIG. 5 illustrates a computer screen display showing an electronic calendar application user interface showing a narrow mode navigation pane according to embodiments of the present invention.

Referring now to FIG. 5, the narrow mode navigation pane 400 is illustrated with respect to an example electronic calendar application user interface 200. A calendar display 510 is illustrated in the main display space of the user interface 200 for showing different calendar views according to an electronic calendar application. According to embodiments of the present invention, the narrow mode navigation pane 400 is disposed along the left-hand edge of the user interface 200. The toggle 252 is disposed at the upper end of the pane 400 for toggling the narrow mode navigation pane back to a normal mode navigation pane, as described above. Selectable controls 255, 260, 265, 270 are disposed beneath at a lower end of the narrow mode navigation pane 405 for selecting other software applications, as described above.

As shown in FIG. 5, only one section of the narrow mode navigation pane is illustrated, including the "Navigation Pane" control 405. As should be understood, other sections may be added for including other selectable controls, as illustrated above in FIG. 4. For example, one or more selectable controls may be displayed in the pane 400 for allowing a user to selectively navigate between different calendar folders. For example, a first selectable control may be provided for allowing navigation to a business calendar, and a second selectable control may be displayed for allowing navigation to a personal calendar.

Figure 6:
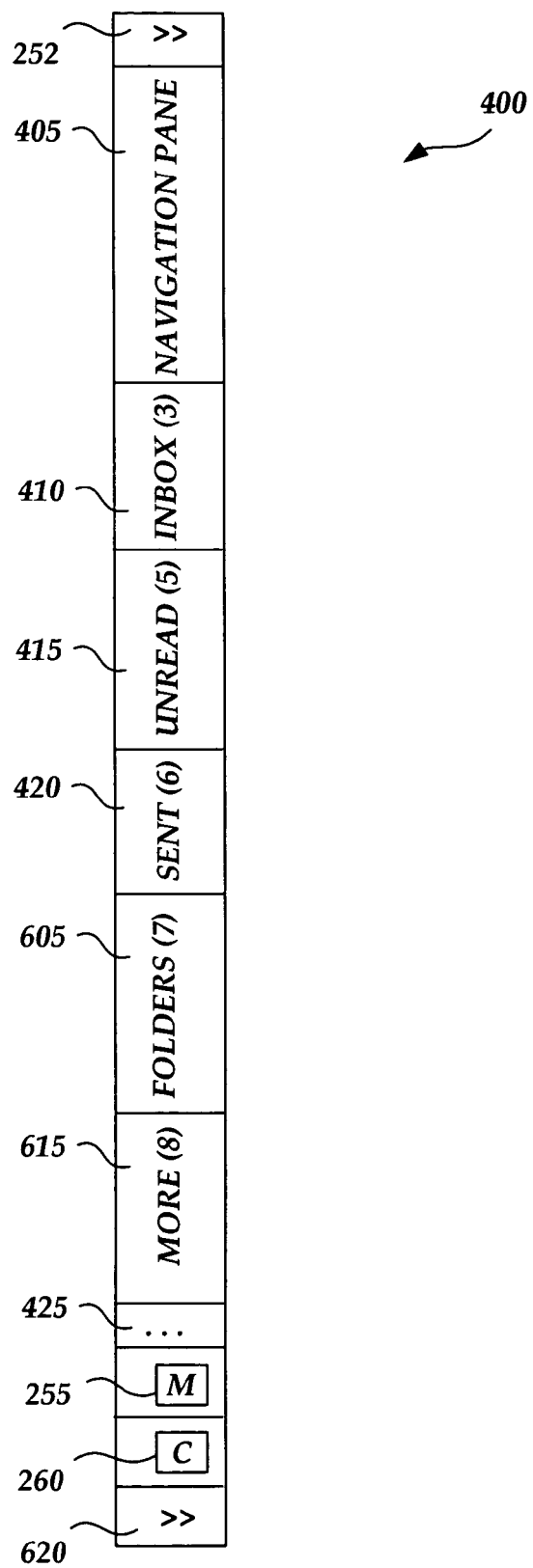
FIG. 6 illustrates a computer screen display of a narrow mode navigation pane according to embodiments of the present invention.

Referring now to FIG. 6, the control 425 may be selected for expanding or contracting the display space in the narrow mode navigation pane 400 for displaying selectable controls associated content and/or functionality of the associated user interface. Upon selection of the control 425, additional space is provided in the pane 400 for selectable controls associated with the normal mode navigation pane. For example, in addition to the "Sent( )" control, the "Unread( )" control, the "Inbox( )" control, and the "Navigation Pane" control, additional space is made available for a "Folders" control and a "More" control. By expanding the available space for selectable controls associated with the user interface in use, the space available in the pane 400 for software application control icons is decreased. Accordingly, as illustrated in FIG. 6, only two software application selection controls 255 and 260 are displayed.

As illustrated in FIG. 6, an icon 620 is provided for selectively displaying additional software application controls. For example, selection of the icon 620 may replace the icons 255, 260 with icons associated with other available software applications. According to one embodiment of the present invention, a second selection of the control 425 may replace the display configuration of the pane 400 back to a standard display configuration whereby all available software application selection controls 255, 260, 265, 270 are displayed in the lower end of the pane 400, and where the space for displaying selectable controls 405, 410, 415, 420, 605, 615, associated with the narrow mode navigation pane is decreased.

Figure 7:
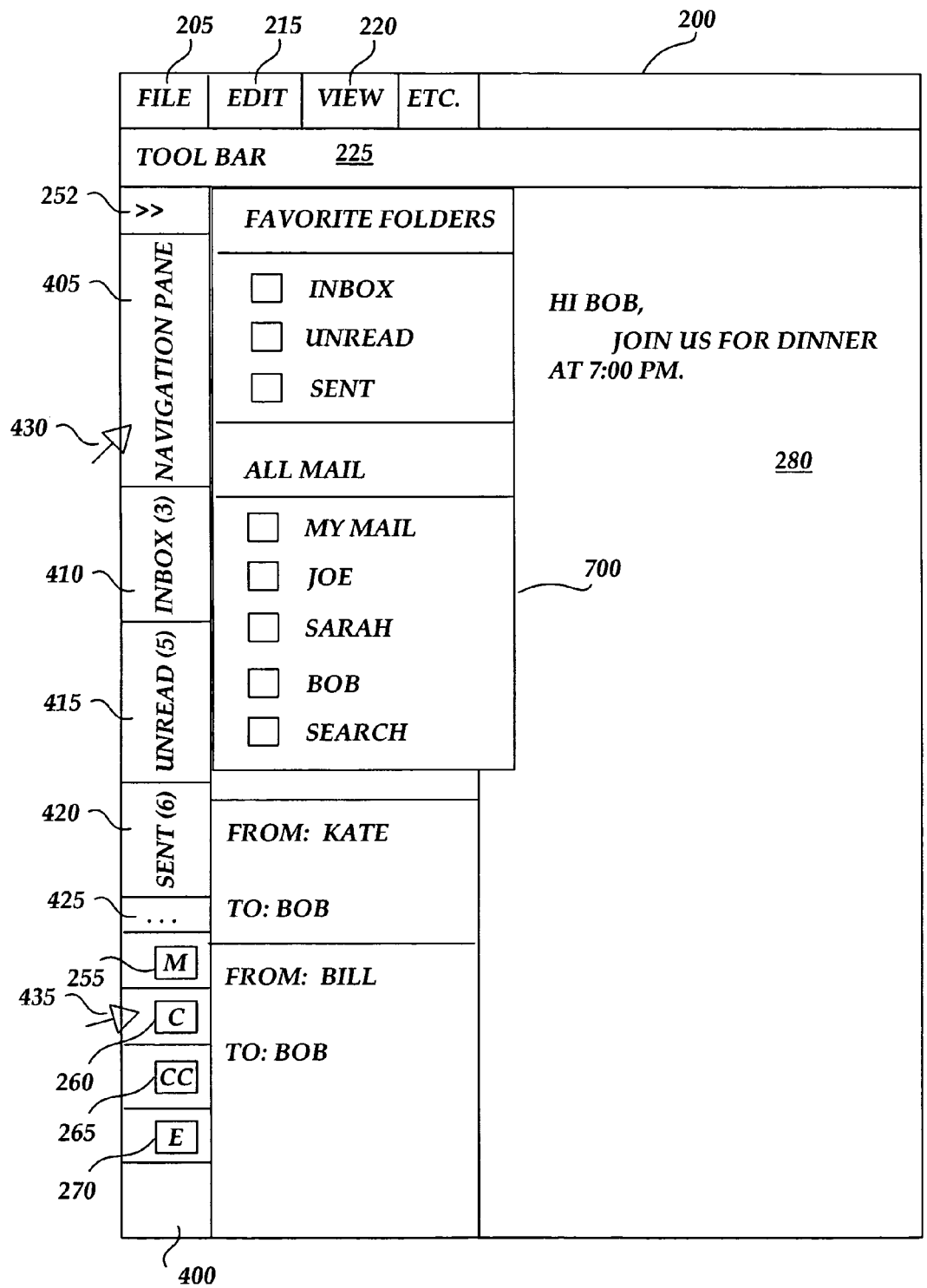
FIG. 7 illustrates a computer screen display of an electronic mail application user interface showing a narrow mode navigation pane and a temporary pop-up normal mode navigation pane according to embodiments of the present invention.

Referring now to FIG. 7, selection of the "Navigation Pane" control 405 in the narrow mode navigation pane 400 causes a pop-up version of the normal mode navigation pane to be displayed alongside the narrow mode navigation pane 400. According to embodiments of the present invention, the width of the pop-up pane 700 is the same width as the normal mode navigation pane 230, illustrated in FIG. 2. Additionally, the pop-up pane 700 is resizable by the user. The vertical size of the pop-up pane 700 is determined by the contents of the pane. That is, the pop-up pane 700 is typically displayed with enough height to show all contents of the pane without the need for a scroll bar. If folders in the pop-up pane are expanded or collapsed, the height of the pop-up pane 700 adjusts to fit the contents. The maximum height of the pop-up pane 700 is the same as the maximum height of the normal mode navigation pane 230. The bottom of a lengthy pop-up pane 700 normally aligns with the top of the gutter area of the navigation pane according to one embodiment.

According to an embodiment of the present invention, the pop-up pane 700 is temporary for allowing the user to review and/or select the contents of the normal mode navigation pane without changing back to a normal mode display of the navigation pane. According to one embodiment, the pop-up pane 700 shows the same contents and functionality items as the associated normal mode navigation pane 230. While the pop-up pane 700 is displayed, a user may review and select items contained in the pop-up pane. For example, referring to FIG. 7, if the user desires to select a given mail folder, for example the "Sarah" mail folder in the lower portion of the pop-up pane 700, the user may select that item, and the mailbox 275 and the associated mail view pane 280 will be populated with corresponding electronic mail data.

According to one embodiment, the user may also change the contents of the narrow mode navigation pane 400 by dragging one or more items from the pop-up pane 700 over to the pane 400. For example, if the user would prefer to have a selectable control in the pane 400 for mail from "Sarah" the user may drag the "Sarah" mail folder icon from the pop-up pane 700 over to the narrow mode navigation pane 400 to add an associated control to the pane 400 or to replace one of the other selectable controls, for example, the "Unread( )" control 415.

Once the pop-up pane 700 is displayed, as illustrated in FIG. 7, if the user selects (e.g., mouse clicks) outside the area of the pop-up pane, the pop-up pane is dismissed. Similarly, if the user clicks on a view that causes a view change, the pop-up pane is closed or dismissed. If the user selects a link in the pop-up pane 700, the pane is closed. If the user selects a given content item or functionality in the pop-up pane 700, the selected content or functionality is provided, and the pop-up pane 700 remains displayed. Alternatively, upon selection of a given content item or functionality from the pop-up pane 700, the pop-up pane may be closed from view.

Figure 8:
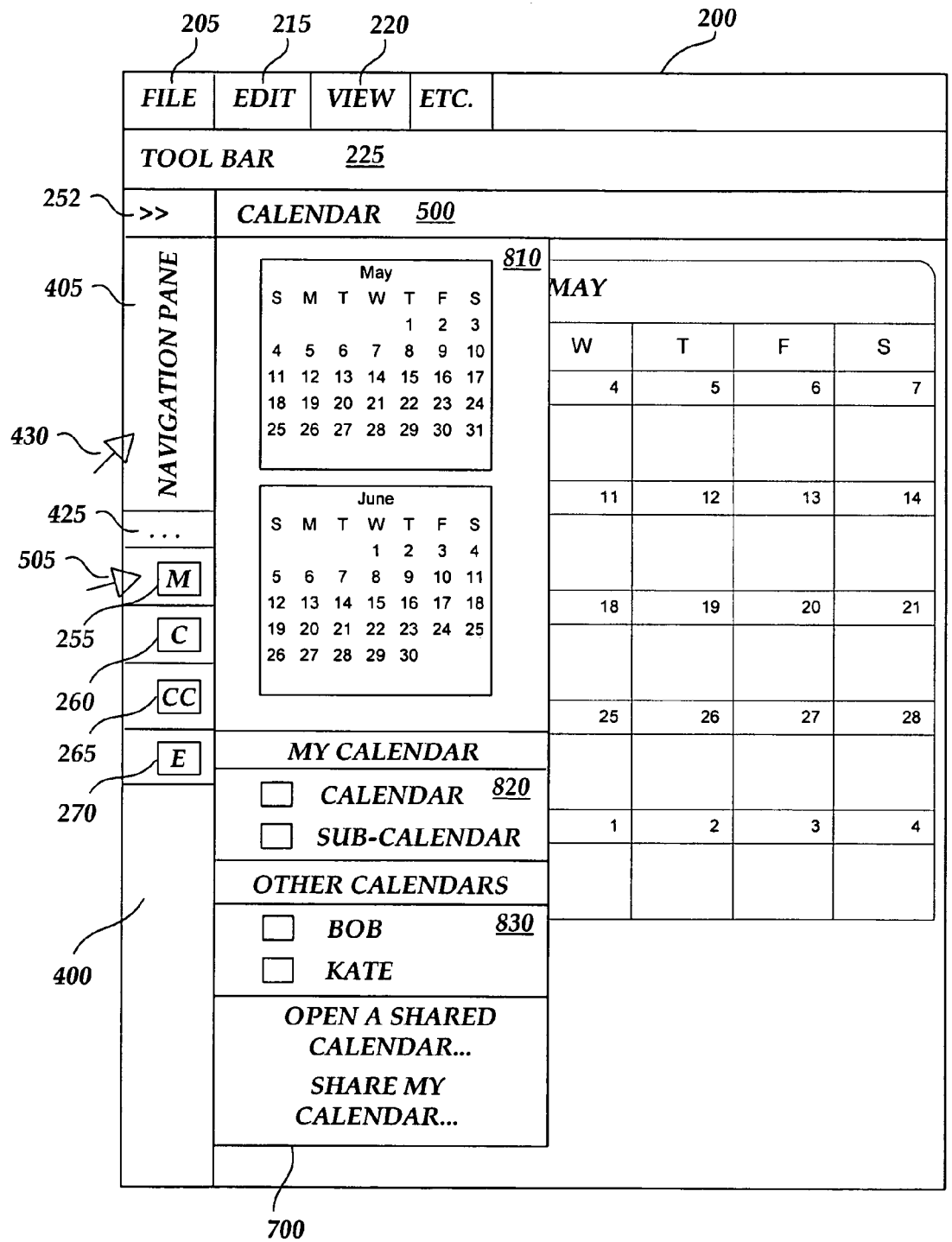
FIG. 8 illustrates a computer screen display showing an electronic calendar application user interface of FIG. 5 with a temporary pop-up of a normal mode navigation pane according to embodiments of the present invention.

Referring now to FIG. 8, the temporary pop-up navigation pane 700 is illustrated with respect to an example electronic calendar application user interface 200. As with the electronic mail application user interface, illustrated in FIG. 7, the pop-up pane 700 for the electronic calendar application provides the same content and selectable functionality as a normal mode navigation pane for an electronic calendar application. For example, the pop-up navigation pane 700 includes one or more date picker controls 810, and one or more calendar folders 820, 830. Selection of a particular month, week, or date from one of the date pickers 810 in the pop-up pane 700 causes the displayed calendar in the user interface 200 to dynamically change to the selected calendar month, week, or date. Selection of a particular calendar view from one of the calendar folders 820, 830 causes display of the selected calendar view. For example, selection of a business calendar from one of the calendar folders 820, 830 causes a display of the associated calendar in the same manner as selection of the particular calendar from the normal mode navigation pane.

In addition to the methods for closing the pop-up pane 700 described above, with respect to the calendar application user interface 200, if a user selects a non-calendar folder causing navigation to the selected folder, the pop-up pane 700 is closed. On the other hand, according to embodiments of the present invention, the pop-up pane 700 remains open and functional until the user clicks anywhere outside the pop-up pane 700. Accordingly, a user may open the pop-up pane 700, check and uncheck displayed calendars without closing the pop-up pane 700. As described above with reference to FIG. 7, switching to another application, for example, a contacts application or electronic mail application causes the pop-up pane 700 to close.

As described herein, a narrow mode navigation pane may be selectively displayed as a replacement of a normal mode or full-size navigation pane to allow more computer display space for displaying other user interface content. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method performed by a computing device, the method comprising:
    displaying, on an output device, a navigation pane in a normal operating mode such that the navigation pane is positioned along an edge of a computer-generated user interface and such that the navigation pane contains:
        a first plurality of software application selection controls, each of which contains a horizontally-written name of one software application in a plurality of software applications; and
        a first section that includes a first set of selectable controls associated with a selected software application in the plurality of software applications, wherein each of the selectable controls in the first set of selectable controls contains a horizontally-written name of a functionality associated with the selected software application;
    displaying, on the output device, a display mode toggle control for enabling a user to choose between the normal operating mode for the navigation pane and a narrow operating mode for the navigation pane;
    displaying, on the output device, a preview pane for displaying data of a data type associated with the selected software application, the preview pane being displayed within the computer-generated user interface;
    receiving, at the computing device, a first input that indicates that the user has used the display mode toggle control to choose the narrow operating mode for the navigation pane;
    in response to receiving the first input, displaying, on the output device, the navigation pane in the narrow operating mode such that the navigation pane is positioned along the edge of the computer-generated user interface, such that the navigation pane is narrower than the navigation pane in the normal operating mode, and such that the navigation pane contains:
        a second plurality of software application selection controls, each of which contains an icon associated with one software application in the plurality of software applications, wherein the second plurality of software application selection controls do not contain the names of the software applications in the plurality of software applications;
        a second section that includes a subset of the first set of selectable controls associated with the selected software application, each selectable control in the subset containing a name of a functionality of the selected software application written vertically within the navigation pane; and
        a navigation pane control for enabling the user to see a pop-up pane that contains the first section as presented in the navigation pane in the normal operating mode;
    receiving, at the computing device, a second input that indicates that the user has selected the navigation pane control;
    in response to receiving the second input, temporarily displaying the pop-up pane on the output device along with the navigation pane in the narrow operating mode;
    receiving, at the computing device, a third input, the third input indicating that the user has selected a selectable control in the first set of selectable controls; and
    in response to receiving the third input, displaying, on the output device, data of the data type associated with the selected software application, the data being displayed within the preview pane.

2. The method of claim 1,
    wherein the selected software application is an electronic mail application;
    wherein the data of the data type associated with the selected software application is an electronic mail message; and
    wherein the preview pane is wider when the navigation pane is in the narrow operating mode than when the navigation pane is in the normal operating mode.

3. The method of claim 2,
    wherein a plurality of the selectable controls in the first set of selectable controls are associated with electronic mail mailboxes; and
    wherein the method further comprises:
        receiving, at the computing device, a fourth input, the fourth input indicating that the user has selected one of the selectable controls in the first set of selectable controls that is associated with one of the electronic mail mailboxes; and
        in response to receiving the fourth input, displaying, on the output device within the computer-generated user interface, a list of electronic mail messages in the one of the electronic mail mailboxes.

4. The method of claim 1, further comprising:
    receiving, at the computing device, a fifth input, the fifth input indicating that the user has selected a second software application selection control in the first plurality of software application controls, the second software application selection control being associated with a second software application, the second software application being in the plurality of software applications; and in response to receiving the fifth input, displaying, on the output device, the navigation pane in the normal operating mode such that the navigation pane in the normal operating mode contains:

the first plurality of software application selection controls; and a third section that includes a second set of selectable controls associated with the second software application, each selectable control in the second set of selectable controls containing a horizontally-written name of a functionality of the second software application.

5. The method of claim 4, wherein the second software application is an electronic calendar application.

6. The method of claim 1, wherein displaying the display mode toggle control comprises:

displaying, on the output device, a drop-down menu that enables the user to select various view properties; and displaying, on the output device, a pop-out menu that includes a control associated with the narrow operating mode of the navigation pane and a control associated with the normal operating mode of the navigation pane.

7. The method of claim 1, wherein displaying the display mode toggle control comprises displaying the display mode toggle control as an icon within the navigation pane in the normal operating mode.

8. The method of claim 1, wherein displaying the navigation pane in the narrow operating mode comprises displaying the navigation pane such that the navigation pane further contains a display space expansion control; and wherein the method further comprises:

receiving, at the computing device, a sixth input, the sixth input indicating that the user has selected the display space expansion control; and in response to receiving the sixth input, displaying the navigation pane in the narrow operation mode on the output device such that space available within the navigation pane for displaying the second plurality of software application selection controls is decreased.

9. The method of claim 1, wherein each of the software applications in the plurality of software applications is part of a multiple-functionality software application.

10. A computer-readable storage medium comprising instructions that, when executed by a computing device, cause the computing device to:

display, on an output device coupled to the computing device, a computer-generated user interface of a multiple-functionality software application, the computer-generated user interface containing a navigation pane in a normal operating mode positioned along an edge of the computer-generated user interface, the navigation pane containing:

a first plurality of software application selection controls, each of which contains a horizontally-written name of one software application in a plurality of software applications associated with the multiple-functionality software application; and a first section that includes a first set of selectable controls associated with a selected software application in the plurality of software applications, wherein each of the selectable controls in the first set of selectable controls contains a horizontally-written name of a functionality associated with the selected software application;

display, on the output device, a display mode toggle control for enabling a user choose between the normal operating mode for the navigation pane and a narrow operating mode for the navigation pane;

displaying, on the output device, a preview pane for displaying data of a data type associated with the selected software application, the preview pane being displayed within the computer-generated user interface;

receive a first input that indicates that the user has used the display mode toggle control to choose the narrow operating mode for the navigation pane;

in response to receiving the first input, display, on the output device, the navigation pane in the narrow operating mode such that the navigation pane is positioned along the edge of the computer-generated user interface, such that the navigation pane is narrower than the navigation pane in the normal operating mode, and such that navigation pane contains:

a second plurality of software application selection controls, each of which contains an icon associated with one software application in the plurality of software applications, wherein the second plurality of software application selection controls do not contain the names of the software applications in the plurality of software applications;

a second section that includes a subset of the first set of selectable controls associated with the selected software application, each selectable control in the subset containing a name of a functionality of the selected software application written vertically within the navigation pane; and a navigation pane control for enabling the user to see a pop-up pane that contains the first section as presented in the navigation pane in the normal operating mode;

receive a second input that indicates that the user has selected the navigation pane control;

in response to receiving the second input, temporarily display the pop-up pane on the output device along with the navigation pane in the narrow operating model;

receive a third input, the third input indicating that the user has selected a selectable control in the first set of selectable controls; and in response to receiving the third input, display, on the output device, data of the data type associated with the selected software application, the data being displayed within the preview pane.

11. The computer-readable storage medium of claim 10, wherein a first software application in the plurality of software applications is an electronic mail software application and a second software application in the plurality of software applications is an electronic calendar software application.

12. A computing device comprising:

a processing unit that is capable of executing instructions;

an output device capable of displaying a graphical user interface;

an input device; and a system memory containing a multiple-functionality software application comprising instructions that, when executed by the processing unit, cause the processing unit to:

display, on the output device, a navigation pane in a normal operating mode such that the navigation pane is positioned along an edge of a computer-generated user interface of the multiple-functionality software application and such that the navigation pane contains:
- a first plurality of software application selection controls, each of which contains a horizontally-written name of one software application in a plurality of software applications associated with the multiple-functionality software application, the plurality of software applications including an electronic mail software application and an electronic calendar software application;
- a first section that includes a first set of selectable controls associated with a selected software application in the plurality of software applications, wherein each of the selectable controls in the first set of selectable controls contains a horizontally-written name of a functionality associated with the selected software application; and
- a display mode toggle control that enables a user choose to between the normal operating mode for the navigation pane and a narrow operating mode for the navigation pane;

display, on the output device, within the computer-generated user interface, a preview pane for displaying data of a data type associated with the selected software application;

receive a first input from the input device, the first input indicating that the user has used the display mode toggle control to choose the narrow operating mode for the navigation pane;

in response to receiving the first input, display, on the output device, the navigation pane in the narrow operating mode such that the navigation pane is positioned along the edge of the computer-generated user interface, such that the navigation pane is narrower than the navigation pane in the normal operating mode, and such that navigation pane contains:
- a second plurality of software application selection controls, each of which contains an icon associated with one software application in the plurality of software applications, wherein the second plurality of software application selection controls do not contain the names of software applications in the plurality of software applications;
- a second section that includes a subset of the first set of selectable controls associated with the selected software application, each selectable control in the subset containing a name of a functionality of the selected software application written vertically within the navigation pane;
- a navigation pane control for enabling the user to see a pop-up pane that contains the first section as presented in the navigation pane in the normal operating mode; and
- the display mode toggle control;

receive a second input from the input device, the second input indicating that the user has selected the navigation pane control;

in response to receiving the second input, temporarily display the pop-up pane on the output device along with the navigation pane in the narrow operating mode;

receive a third input from the input device, the third input indicating that the user has selected a selectable control in the first set of selectable controls contained in the pop-up pane; and in response to receiving the third input, displaying, on the output device within the preview pane, data of the data type associated with the selected software application, wherein the preview pane is wider when the navigation pane is in the narrow operating mode than when the navigation pane is in the normal operating mode.

\* \* \* \* \*